US008526973B2

(12) United States Patent
Thomson

(10) Patent No.: US 8,526,973 B2
(45) Date of Patent: Sep. 3, 2013

(54) SAFETY SYSTEM TO DISABLE AND ACTIVATE FUNCTIONS IN SMARTPHONE'S, MOBILE PHONES AND PORTABLE COMMUNICATION DEVICES WHILE DRIVING

(76) Inventor: John Douglas Thomson, West Palm Beach, FL (US)

( * ) Notice: Subject to any disclaimer, the term of this patent is extended or adjusted under 35 U.S.C. 154(b) by 160 days.

(21) Appl. No.: 13/065,324

(22) Filed: Mar. 21, 2011

(65) Prior Publication Data
US 2012/0244849 A1    Sep. 27, 2012

(51) Int. Cl.
*H04W 4/04*    (2009.01)
(52) U.S. Cl.
USPC .......................................... 455/456.4; 455/418
(58) Field of Classification Search
USPC ....... 455/410, 411, 418, 436, 456.4; 375/242
See application file for complete search history.

(56) References Cited

U.S. PATENT DOCUMENTS
2007/0242755 A1 * 10/2007 Ochoa ........................... 375/242

* cited by examiner

Primary Examiner — Sam Bhattacharya

(57) ABSTRACT

The present invention is a safety system that prevents the use of certain Smartphone functions and replace the blocked functions with alternative ways to communicate while in a car. These functions include text, voice (manually dialing to make calls) and internet. Smartphone includes any mobile phone or portable communication device that allows software applications to be downloaded and run on its operating system. The system uses a local RF transmitter located and mounted in the car to send a signal that can be detected by one or all of the Smartphone's in the car. The Smartphone's, which have downloaded the application, will decode the RF signal and disable and/or activate certain functions of the Smartphone. Which functions to disable and/or activate are previously chosen by a user of the downloaded application. By use of this system, young drivers, but not limited to, will not be distracted while driving, and thus forced to pay attention to their surroundings. Therefore automobile accidents will be reduced.

11 Claims, 3 Drawing Sheets

SAFETY SYSTEM TO DISABLE AND ACTIVATE FUNCTIONS IN SMARTPHONE'S, MOBILE PHONES AND PORTABLE COMMUNICATION DEVICES WHILE DRIVING

BACKGROUND OF THE INVENTION

With the explosion of Smartphone's, mobile phones and portable communication devices many young people now own them and use them daily. Since people use these devices for voice, internet and text, many people are in constant communication and have lost their attention to events surrounding them. People are busy communicating everywhere you go including behind the wheel of an automobile.

Since young people have more accidents annually than any other demographic group, it would be advantageous to prevent young or inexperienced drivers, but not limited to, from having the ability to access their Smartphone, mobile phone and portable communication devices while driving.

The National Safety Council announced in January 2011 that it estimates at least 28% of all traffic crashes—or at least 1.6 million crashes each year—are caused by drivers using mobile phones and texting. The National Safety Council estimates that 1.4 million crashes each year are caused by drivers using Smartphone's and a minimum of 200,000 additional crashes each year are caused by drivers who are texting. With more people using Smartphone's we can only expect the number of accidents to increase.

OBJECT OF THE INVENTION

The objective of this invention to reduce accidents by automatically preventing drivers from receiving or making voice (manually dialing to make a call), text, or Internet exchange while in the car. Ideal customer are parents, but not limited, who want to ensure their kids cannot use the phone while driving. This invention will automatically block usage of the Smartphone. The invention will accomplish this by using software on the portable mobile communication device to use two functions to disable or activate the device based on a commands selected by a person on a user interface. Still further, the invention will allow the Smartphone to function and return to their normal programmed settings once the key is removed from the ignition.

SUMMARY OF THE INVENTION

The invention uses software applications running on Smartphone's to control functionality of the Smartphone while in a car. Once the application is downloaded the Smartphone functions will enable drivers to drive distraction free. The term Smartphone includes any mobile phone or portable communication device that allows software applications to be downloaded and run on its operating system. In order to operate, the invention will have a RF transmitter located in an automobile, which produces an RF signal that will be present while the car is running or the key is in the ignition. Smartphones in the car will be able to receive the RF transmission if they have the appropriate software application running. Then by decoding the RF signal and processing it using the downloaded software the functionality of the Smartphone will be controlled. For example texting, internet and voice (manually dialing to make a call) could all be disabled (disable) while activating (activate) "hands free" and "no phone zone" would limit the functionality of the Smartphone. Once the car is turned off, all functions will return the Smartphone to normal settings since the RF signal will no longer be sent.

DRAWINGS

DETAILED DESCRIPTION OF THE INVENTION

System overview. Software applications can be purchased from online distribution or physical retailers. Along with the purchase of the software app, transmitters will also be sold. There need not be a one-to-one correlation since one application may receive signals from several transmitters or several Smartphone's may receive signals from just one transmitter.

Then using the purchased software interface, the administrator may select which functionality to disable or activate on the Smartphone by turning on a function. This selection is done by simply selecting from a user interface that the downloaded application presents when it is running. Once the administrator chooses the disable and/or activate function of the Smartphone they can lock the application by using a code word or key.

Figure 1:
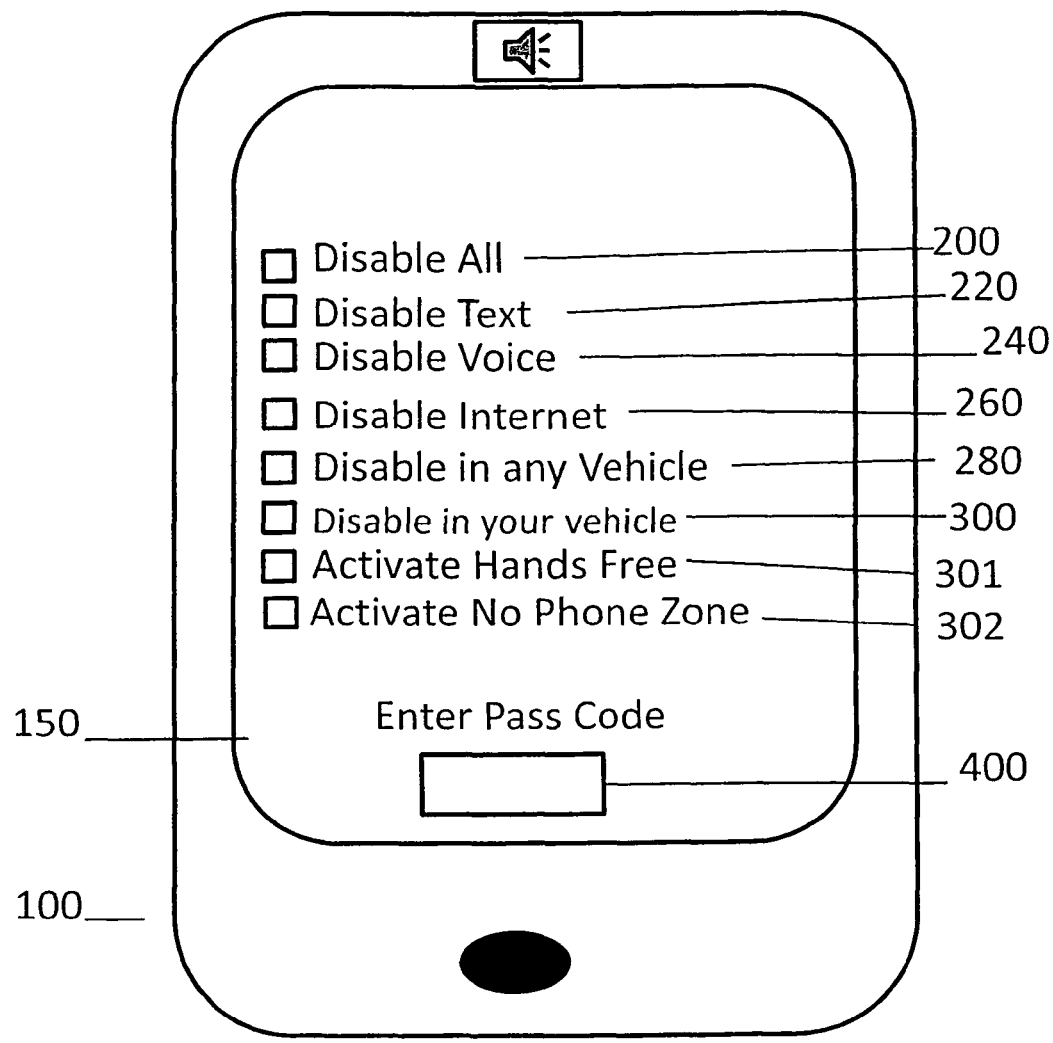
FIG. 1 is an example of the user interface where the administrator can select what functionality, disable or activate while in the automobile.

FIG. 1 shows a typical layout of the administration function of the software application running on a Smartphone 100 and displayed on display screen 150, the screen could be a touch screen or cursor/keyboard operated. Display on screen could be on separate screens depending on font size and settings. Administrators, can select boxes 200-302 as to what type of functionality will be disabled (disable) or activated (activate) when the Smartphone 100 receives the RF transmitted signal. Then the administrator can lock the application so that it is always running and can only be altered if the correct codeword or key is entered in data field 400. It should be noted that Smartphone 100, could be added to any mobile phone or portable communication device. Examples would be but not limited to Apple's IPhone or Google's Droid. Also the administrators screen may also be protected by use of code word or key.

Examples of the type of functionality that could be disabled (disable) are 200-300 All, text, Voice, and Internet. Examples of the type of functionality that could be activated (activate) are 301-302 hands free and no phone zone. Radio switches will control a number of combinations. All text, voice, internet, hands free and no phone zone 200-302 functions can be disabled or activated. Activate the no phone zone 302 will limit the Smartphone 100 to emergency hands free capability. Activate hands free 301 will limit the Smartphone 100 to voice and voice commands. These are not the only options that could be presented of course, nor are the order which they are displayed critical. A person may want to disable any function that takes eyes off the road, such as text, internet and voice (manually dialing a number), but may leave some functionality such as 911 emergency calls.

User interface can also include the disable functions by selecting boxes 280 and 300. For example, the administrator might want to disable and activate the Smartphone 100 in any vehicle that is equipped with an RF transmitter, not just their own. If this be the case, the system would use a hash function in the codeword.

Figure 2:
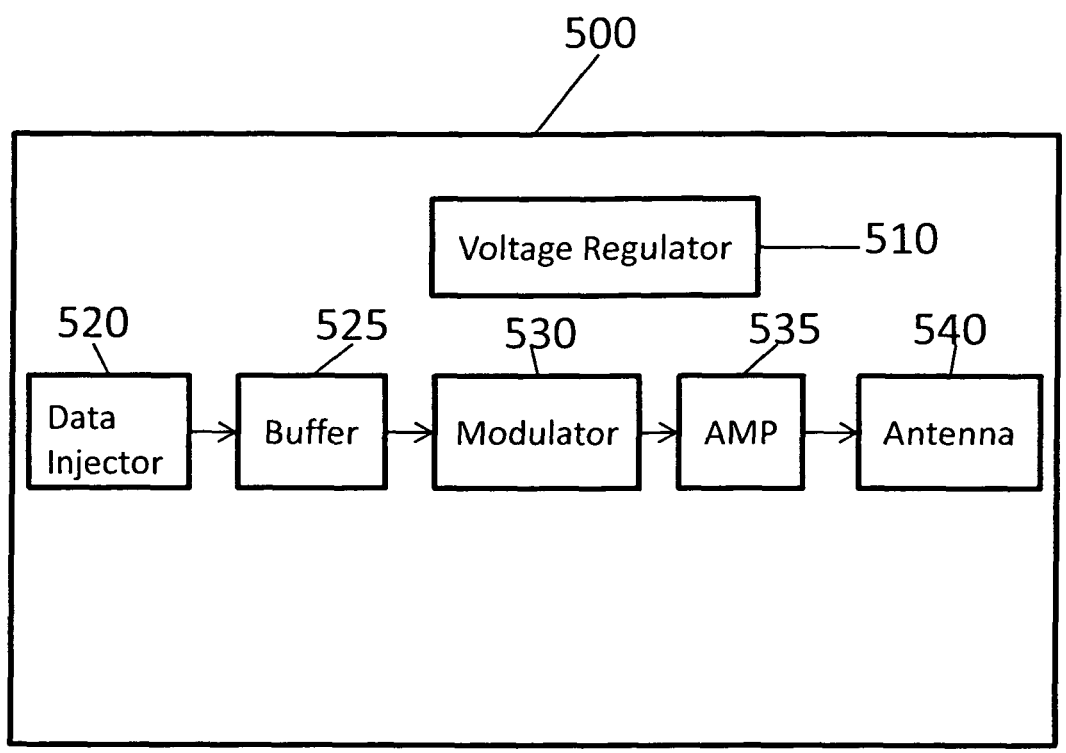
FIG. 2 is an example of the small RF transmitter.

FIG. 2 shows an example of the RF transmitter 500. It should be mounted in the car either in the dashboard or under the hood. It could also be located inside the automobile. RF transmitter 500 should be connected to the ignition switch so that it receives power either when the key is entered or switched to any position the owner desires. For example, it may be set up to receive power only when the car is running or even when the key is inserted. Once power is given to the RF transmitter, it goes to a voltage regulator 510 which converts the voltage from 12 VDC to less than 3.4 VDC so operation of the ICs 520-540 is possible. Voltage level should also be controlled to allow for determining the range at which the RF signal is received. From data injection circuit 520 digital data codes are supplied to the modulator 530 via Buffer 525. These codes can include an address (which could be hashed), control signals, commands, protocols and timing information. The data can be entered by SPI interface. These codes are decoded by the software running on Smartphone 100. Modulator 530 modulates the digital data received from the data injector at 2.4 GHz range. At this frequency, data can be received via BLUETOOTH applications or wifi or a proprietary modulation scheme. The data could also be modulated with CCK techniques. It should be noted that other carrier frequencies could be used, to be received by any of the 802.11 sections or any other carrier frequency. Modulated data is sent to the antenna 540 where it is transmitted to the area of the interior of the vehicle.

Therefore the signals created by the RF transmitter 500 are sent when powered by the car battery via the ignition switch and are received in a local area where driver and passenger's cell phones can pick-up the signals and disable selected functions of the cell phone to prevent drivers from being distracted. Also, power could be located inside the RF transmitter and use the car battery power only to control a switch (not shown) to turn on the RF transmitter. The transmitter need only be 2 inch square or smaller. RF transmitter 500 could also have a power gain control outside the device to allow for adjustment of range. It should also be noted that when the app is running it prevents wifi from being cutoff.

Figure 3:
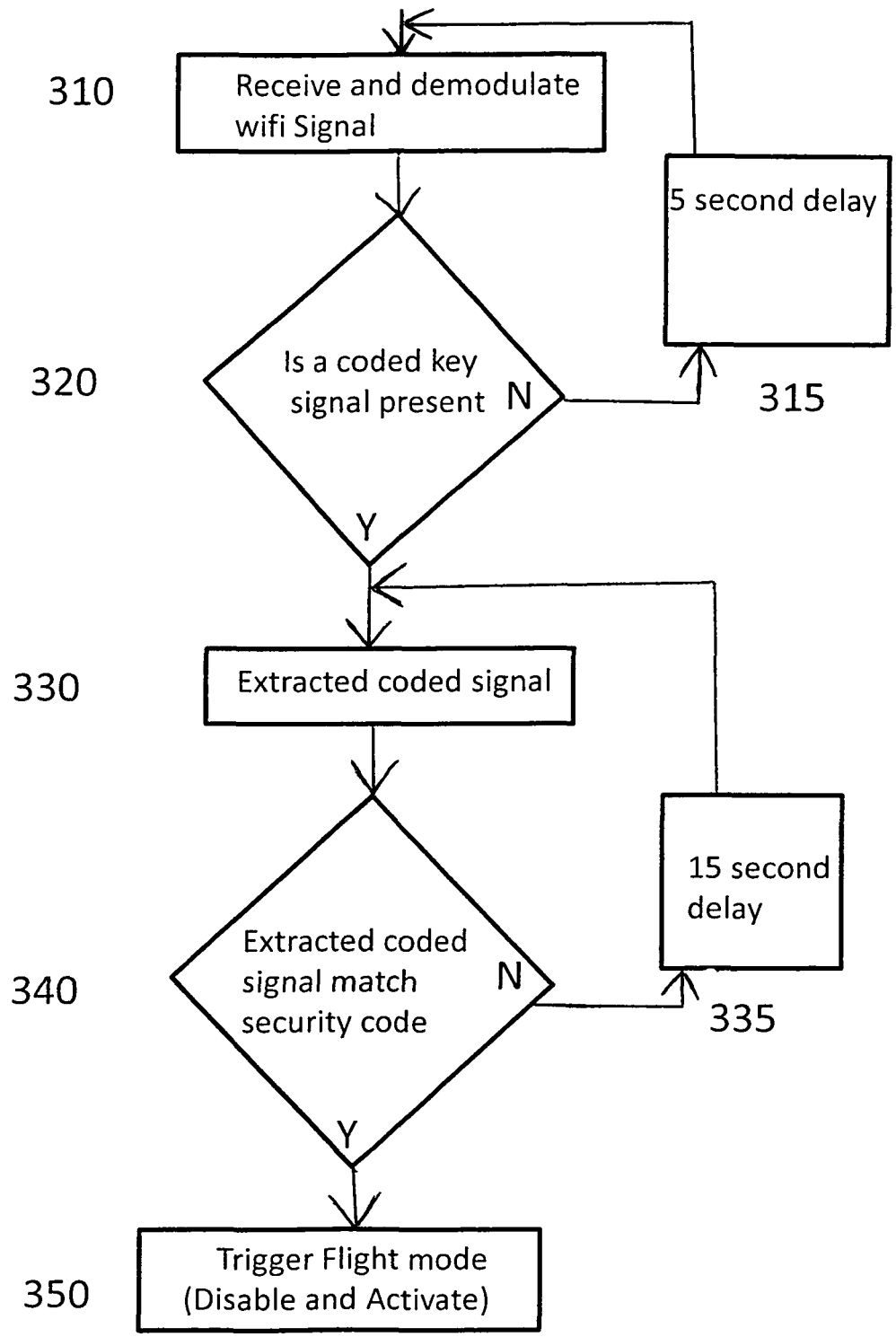
FIG. 3 is a flow chart of the software commands used to detect signals to determine which functions to disable or activate on the Smartphone.

The flow chart shown in FIG. 3 will be explained. After the wifi disconnect is disabled (not shown) by software control of the applications, coded signals are received and demodulated. A processor will determine if a key signal is present. If no signal is present software control is suspended for a few seconds so that the Smartphone's processor may be freed up (shown at step 315). At step 330 the signal is extracted and processed to see if the security code is present step 340. If it is not then wifi is present but phones need not be inhibited. However, should the code word be decoded and verified, based on the code functions should be triggered off. This security code would best be a codeword or cipher coded with a hybrid encryption. Again, the user interface makes selecting which functions to disable and activate easy. If the user wants to use functions, the application simply needs to enable the flight mode.

As understood, the delay times of a few seconds are meant to allow the Smartphone's processor to be freed up to process other data and perform its other functions. This is especially important when the user is in a wifi hotspot, not in a car, delay times are long enough to allow full functionality of the Smartphone without constant checking to see if the coded data is present.

It is believed that the use of this system will help prevent automobile accidents and help keep our roads safe for all drivers.

I claim:

1. A method of preventing the use of a portable communication device while in an automobile, the method comprising the steps of:
    Selecting from a user interface displayed on the portable communication device, functions to be disabled on the portable communication device;
    Transmitting a coded RF signal, from an RF transmitter mounted on the automobile when a specific ignition setting is detected;
    receive and demodulate the coded RF signal by the portable communication device;
    determine with a processor whether a key signal is present in the coded demodulated signal and if not delay software control of the processor for a predetermined amount of time;
    if the key signal is present extract the coded key signals from the demodulated signals and determine if the extracted coded key signals matches a security code; if no security code is present then delay software control of the processor for another predetermined amount of time; and
    disabling functions on the portable communication device that were selected via the user interface based on the security code if the extracted coded key signals match the security code.

2. The method of claim 1 further comprising regulating voltage to said RF transmitter using a voltage regulator circuit.

3. The method of claim 1 further comprising selecting, from the user interface displayed on a device, activate hands free, activate no phone zone, disable voice, disable text, disable internet, disable in any vehicle and disable in your vehicle functionality of the portable communication device.

4. The method of claim 1, further comprising displaying the user interface from an i-phone application.

5. A method of preventing the use of a portable communication device while in an automobile, comprising the steps of:
    selecting from a user interface displayed on a device, functions to disable and activate on the portable communication device;
    transmitting an RF signal, from an RF transmitter mounted on the automobile when a specific ignition setting is detected; and
    disable and activate functions on said portable communication device that were selected via the user interface when said RF signal is detected.

6. A system of preventing the use of certain Smartphone functions while in an automobile, comprising:
    a portable communication device with a processor which allows selection from a user interface displayed on the portable communication device, functions to disable and activate on said portable communication device;
    the automobile which has an ignition switch;
    a transmitter located on the automobile that transmits an RF signal when a specific ignition setting of the ignition switch is detected; and
    the portable communication device being controlled by software;
    said software is configured to receive and demodulate the RF signal, then the software is used to determine if a coded signal is present, if no coded signal is present the software is used to delay software control of the processor, if the coded signal is present, the software is used to determine if a security code is present, and if the security code is present said software control disable and activate said selected functions of the portable communication device.

7. The system as described in claim 6 further comprising: said portable communication device further including the processor uses CCK to demodulate the modulated signals.

8. The system as described in claim 6 further comprising: selecting from the user interface to disable at least two functions from the list of: text, internet and voice.

9. The system as described in claim 7 further comprising: selecting from said user interface to disable at least two functions from the list of: text, internet and voice while keeping at least one of said functions active on said portable communication device.

10. The system as described in claim 9 further comprising: the RF signal is sent when a key is detected in the ignition, without the automobile being started.

11. The system of claim 10 further comprising regulating voltage to said RF transmitter using a voltage regulator circuit.

\* \* \* \* \*